(12) United States Patent
Ito et al.

(10) Patent No.: US 6,564,244 B1
(45) Date of Patent: May 13, 2003

(54) SYSTEM FOR CHAT NETWORK SEARCH NOTIFYING USER OF CHANGED-STATUS CHAT NETWORK MEETING USER-TAILORED INPUT PREDETERMINED PARAMETERS RELATING TO SEARCH PREFERENCES

(75) Inventors: Hidenobu Ito, Kawasaki (JP); Kazuki Matsui, Kawasaki (JP); Tatsuro Matsumoto, Kawasaki (JP); Hitoshi Yamauchi, Kawasaki (JP); Noboru Iwayama, Kawasaki (JP); Kenichi Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/385,962

(22) Filed: Aug. 30, 1999

(30) Foreign Application Priority Data

Sep. 30, 1998 (JP) .......................... 10-277135

(51) Int. Cl.[7] .............................. G06F 15/16
(52) U.S. Cl. .................. 709/204; 709/203; 709/223; 709/224
(58) Field of Search .............. 709/203, 204, 709/223, 224

(56) References Cited

U.S. PATENT DOCUMENTS

| | | | | |
|---|---|---|---|---|
| 5,761,662 A | * | 6/1998 | Dasan | 707/10 |
| 5,920,848 A | * | 7/1999 | Schutzer et al. | 705/33 |
| 5,933,778 A | * | 8/1999 | Buhrmann et al. | 379/211.02 |
| 5,974,409 A | * | 10/1999 | Sanu et al. | 707/1 |
| 6,029,195 A | * | 2/2000 | Herz | 707/10 |
| 6,076,100 A | * | 6/2000 | Cottrille et al. | 709/203 |
| 6,215,877 B1 | * | 4/2001 | Matsumoto | 380/277 |
| 6,219,694 B1 | * | 4/2001 | Lazaridis et al. | 455/556 |
| 6,304,864 B1 | * | 10/2001 | Liddy et al. | 706/15 |
| 6,345,290 B2 | * | 2/2002 | Okada et al. | 709/203 |
| 6,393,460 B1 | * | 5/2002 | Gruen et al. | 709/204 |

* cited by examiner

Primary Examiner—Nabil El-Hady
(74) Attorney, Agent, or Firm—Staas & Halsey LLP

(57) ABSTRACT

To notify users, in real time, of information that matches a search preference. Preference database 12, register 11, preference setting unit 1, recording unit 13, preferential search unit 14, notification unit 15 and channel display section 2 are provided. Preference database 12 stores, associated with the user, one or more search preferences to search for a channel. Register 11 registers search preferences in preference database 12. Preference setting unit 1 receives the input of search preferences, and sends them to register 11, associated with the user. Recording unit 13 stores the state of each channel. Preferential search unit 14 judges, based on the state of each channel, whether each channel satisfies any search preference. Based on the judgment of preferential search unit 14, notification unit 15 notifies the corresponding user terminal of the channel that meets any search preference of the user. Channel display section 2 outputs the reported contents.

19 Claims, 11 Drawing Sheets

(a)

| CHANNEL LIST |||
|---|---|---|
| CHANNEL NAME | TOTAL PREFERENCES HIT | TOPIC |
| CH2 | 4 | xxx |
| CH5 | 2 | yyy |
| CH3 | 2 | zzz |
| ... | ... | ... |

| USER NAME | KEYWORD | CONVERSATION ATMOSPHERE | CHANGE IN TOPIC | NUMBER OF USERS | MODE | PARTICIPATING USERS | PARTED USERS |
|---|---|---|---|---|---|---|---|
| A | AAA | LIVELY | YES | | | Z | |
| B | BBB | NORMAL | | | SECRET | Y | |
| C | AAA | NORMAL | | | SECRET | Y | |
| D | AAA | LIVELY | YES | | PRIVATE | Z | |
| E | BBB | | | | | | |
| ... | ... | | | | | | |

Fig. 9

| KEYWORD PREFERENCE LIST ||
|---|---|
| KEYWORD | USER LIST |
| AAA | A,C,D |
| BBB | B,E |
| ... | ... |

Fig. 10

| ATMOSPHERE PREFERENCE LIST ||
|---|---|
| REMARK FREQ. (X/3min.) | USER LIST |
| 10 OR MORE | A,D |
| 5 OR MORE | B,C |
| ... | ... |

Fig. 11

| STATUS CHANGE PREFERENCE LIST ||
|---|---|
| STATUS CHANGE | USER LIST |
| TOPIC | A,D |
| SECRET MODE | B,C |
| PRIVATE MODE | E |
| ... | ... |

Fig. 12

| PARTICIPATING USER PREFERENCE LIST ||
|---|---|
| PARTICIPATING USERS | USER LIST |
| Z | A,D |
| Y | B,C |
| ... | ... |

Fig. 13

| CHANNEL NAME: CH1 |||
|---|---|---|
| TIME | SPEAKER | REMARK CONTENS |
| 5.20.16:50.20' | U1 | AAA'S THIS AND THAT |
| 5.20.16:50.40' | U2 | YEAH, THAT'S RIGHT |
| 5.20.16:5105' | U3 | BUT, AAA'S SUCH AND SUCH |
| ... | ... | ... |

(3MIN.)

Fig. 14

| CHANNEL NAME: CH1 ||||
|---|---|---|---|
| TIME | SPEAKER | STATUS CHANGE | CONTENTS AFTER CHANGE |
| 5.20.09:50.00' | U1 | TOPIC | NICE DAY TODAY, TOO |
| 5.20.10:20.40' | U2 | MODE | INVITATION ONLY |
| 5.20.15:13.05' | U3 | TOPIC | A-TEAM CHAMPIONSHIP |
| ... | ... | ... | ... |

(1DAY)

SYSTEM FOR CHAT NETWORK SEARCH NOTIFYING USER OF CHANGED-STATUS CHAT NETWORK MEETING USER-TAILORED INPUT PREDETERMINED PARAMETERS RELATING TO SEARCH PREFERENCES

BACKGROUND OF THE INVENTION

1. Technical Field

The present invention relates to a computer network system wherein a plurality of users share the same virtual space and converse simultaneously, and to technology for promoting communication between users in, for example, a chat system.

2. Description of Related Art

Various communication means via computer networks have appeared in recent years due to the diffusion of the Internet. Among them, multi-user and real-time communication means known as chat systems have become a remarkable replacement for conventional electronic mail and telephones. "Chat," then, can be thought of as "live e-mail," in other words, on-line messaging—exchange of remarks—in a system that uses the Internet.

A computer linked to a network via a server computer and running a software application enabling a user to chat with another computer user on that network may be referred to as a "chat client." Users chatting through chat clients and corresponding servers create a chat network that is commonly referred to as "a virtual space." The chat client users thus establish a conversation forum, or so-called channel, in the server and converse in real time. A "chat system" is, then, a communication system defined by chat client users sharing a number of virtual spaces.

To increase user convenience in chat systems, chat clients are offered that can, for example, display a list of channels in which the user is participating. In addition, chat clients are offered that display not only the names but also the conversational content of channels in which the user is participating, independently of displaying the conversational content of the channel on which a user is currently chatting. Furthermore, as means by which a user can search efficiently for a channel desired from among the enormous number of existing channels for convenience in chat systems, chat clients can include channel guide applications. The applications store a log of all channels in advance, and based on a subsequent user request, notify the user of channels that match specified keywords and preferences. Such an application may employ a means external to the application such as a "bot" (or "robot") program that runs continually on the user's computer and links to the Internet to perform a user-like task).

Normally, users often want to know the contents of conversations on channels in which they are not participating, and want to decide whether to join depending on the contents. In conventional chat systems, however, users cannot obtain the content of conversations on channels in which they are not participating, that is, channels which they have not yet joined.

Conventional channel guiding methods succeed to a certain extent in searching for channels that match users' preferences. These methods are essentially so-called "active push" methods of information gathering from a network—in particular the Internet—that is, methods that reply with information in response to individual requests from users. Accordingly, users must send out onto the network their preferences every time they desire a response. Consequently, the contents of conversations on relevant channels may already have changed when a notification is made of channels matching search request preferences, which makes the immediateness (real-time quality) is inadequate. Furthermore, if a log of all the channels is to be obtained, excessive resources are required.

SUMMARY OF THE INVENTION

An object of the present invention is to enable information tailored to users in a chat system to be obtained in real time, and to prevent wasting server resources.

To solve the aforementioned problems, the present invention in a first aspect provides a network search method used in a communication system wherein the same network is mutually shared by a plurality of users and simultaneous bi-directional communication is possible. In the method, one or more search preferences to search for a network are stored, associated with each user; the state of the network is acquired from the communication system every time the state of the network changes, and is stored; based on the stored state, a judgment is made as to whether the network wherein the state ha s changed satisfies any stored search preference; and based on that judgment, the user is notified of the network that satisfies any search preference of the corresponding user.

Every time the status of a network changes that network is judged as to whether it satisfies any preference set by the user. Based on the judgment result, the users are notified of the network that satisfies any search preference of that user. The network desired by the user can be reported in real time.

In a second aspect the present invention provides a network search system used in a communication system wherein the same network is mutually shared by a plurality of user terminals and simultaneous bi-directional communicate is possible. The network search system includes a storage means, a registration means, a configuration means, a recording means, a preferences-based search means, a notification means, and an output means.

The storage means stores, associated with the user, one or more search preferences to search for a network. The registration means registers the search preference in the storage means. The configuration means receives the input of the search preference and sends it to the registration means, associated with the user. The recording means acquires each network state from the communication system, and stores it. Herein, a reduction in resources is achieved by configuring the network search system so that the state of the network is recorded only for a fixed amount or for a fixed period of time. The preferences-based search means judges, based on each network state stored in the recording means, whether each network satisfies any search preference. The notification means, based on that judgment, notifies the user terminal of the network that conforms to any search preference of the respective user. The output means outputs the notification contents.

Taking a chat system as an example, the above-mentioned network corresponds to a channel. Each user sets a channel search preference by a configuration means, and transmits the preference to a recording means. Search preference setting can be accomplished through an originally provided configuration means, or by using, for example, a Web browser or a technique such as data mining, which searches for patterns and correlations in data by statistical algorithms. The registration means stores the transmitted search preference in the storage means by user. Presently, the keyword "AAA" is taken to be registered as the search preference of user A in the storage means. Further, given that a keyword is a search preference, the search is taken to be executed by a preference that the specified keyword appears three or more times in three minutes.

The recording means records, for each channel, the remarking of the keyword "AAA" and the remark time. Only records within three minutes from the present time are held. Furthermore, the recording means rewrites the records every time a change related to the network occurs. A change in the network state is some change related to the channel; for example, a remark from any chat client in any channel, or a change in the mode or number of users in any channel. If a change in a channel arises, the preferences-based search means judges whether that channel now meets each of the search preferences registered in the storage means. If any preference is satisfied, the preferences-based search means transmits the user and channel name to the notification means. The notification means notifies all user terminals for which that search preference is set of the channel that satisfies any search preference. At the user terminal, the output means outputs the channel report name on the screen, for example.

In accordance with the invention in another aspect, the notification means of the network search system acquires from the recording means additional information, i.e. supplemental data related to the network, and reports it along with the network to the user terminal.

If, for example, channel CH1 satisfies the change in channel topic preference, the notification means acquires the channel topic from the recording means, and transmits it along with the channel to the user terminal.

In accordance with the present invention in yet another aspect, the preferences-based search means of the network search system further acquires supplemental data related to the network, and the notification means reports it along with the network to the user terminal.

The supplemental data may also be acquired by the preferences-based search means. In this case, the preferences-based search means acquires the supplemental data in addition to the judgment of whether the search preference is satisfied, and transmits to the notification means the supplemental data along with the preference and network.

In accordance with the invention in still another aspect, the storage means of the network search system stores at least a keyword as the search preference of each user, the recording means records for each network the remark time of the stored keyword and holds the records dating back for a predetermined unit of time, and the preferences-based search means judges, based on the number of remarks of the keyword per unit of time, whether each network satisfies the keyword preference.

As noted earlier, only three minutes of past records are held and, if a keyword is uttered three or more times in three minutes, it is judged that that keyword preference is met.

In accordance with the invention in a further aspect, the storage means of the network search system stores at least the remark frequency as the search preference of each user, the recording means records for each network the remark time every time there is a remark, and holds the records dating back for a predetermined unit of time, and the preferences-based search means judges, based on the number of remarks per unit of time, whether each network satisfies the remark frequency preference.

For example, the recording means records, for each channel, the time when a remark occurs. The records are held for a predetermined unit of time. If the unit of time is five minutes, the preferences-based search means judges, based on the number of times the remark occurs in the past five minutes, whether it matches the user-specified remark frequency search preference.

The network search system storage means of the invention in a still further aspect stores at least a change in topic of the network as the search preference of each user, the recording means acquires the topic every time the topic of any network changes, and stores it, and the preferences-based search means judges, based on that acquisition, whether the relevant network satisfies the network topic change preference.

Using the above-mentioned example of the chat system, the recording means monitors changes in the topic of each channel. If the topic changes in any channel, the recording means acquires the changed topic. If the preferences-based search means judges that that channel satisfies the topic change preference, the channel name is transmitted to the notification means.

The network search system storage means of the invention in yet a further aspect stores at least the range of the number of users that share the network as the search preference of each user, the recording means acquires the number of users every time the number of users sharing any network changes, and stores it, and the preferences-based search means judges, based on that acquisition, whether the number of users of the relevant network conforms to the search preference of each user.

For example, considering a case wherein user A sets a search preference that the number of users on a network is 10 or greater, and user B sets 5 or greater. Every time the number of users on any network changes, the recording means acquires the number of users thereof. Every time the recording means acquires the number of users, the preferences-based search means judges, for that network, whether it is 10 or greater, or whether it is 5 or greater. If the number of users of the network is 10 or greater, it is judged that the search preference of users A and B is satisfied. If 5 or greater, it is judged that the search preference of user B is satisfied.

The network search system storage means in accordance with the present invention in yet another aspect stores at least the joining or parting of a specified user as the search preference of each user, the recording means acquires the user every time the users sharing any network changes, and stores it, and the preferences-based search means compares the users before the acquisition and the users after the acquisition and judges whether it conforms to the search preference of each user.

Assuming for example that user A sets the joining of user C as the search preference, if user C newly joins channel CH1, the preferences-based search means judges that channel CH1 matches the search preference of user A.

The storage means in accordance with the invention in another aspect stores at least the change in mode of each network as the search preference of each user, the recording means acquires the mode every time the mode of any network changes, and the preferences-based search means judges, based on that acquisition, whether the relevant network satisfies the mode change preference.

To explain once again using the example of the chat system, the mode of a channel is an identifier that indicates the characteristics of the channel. For example, private channels, secret channels, invite-only channels and the like can be cited. If a mode changes in any channel, the preferences-based search means judges that that channel matches the mode change preference.

In accordance with the invention in still another aspect, the output means of the network search system varies the output display in accordance with the notification contents reported by the notification means.

For example, in accordance with the hit search preference or supplemental data, the display color is changed, or the display is reversed or highlighted and the like.

The output means in accordance with the invention in yet a further aspect counts the number of notifications for each reported network, and changes, based on the count results, the output display of the notification contents.

It is conceivable to, for example, display in order of the highest count, displaying the counts side by side, changing the font or display color in accordance with the count, or changing the display of the icons.

In accordance with the invention in still another aspect, the network search system is further provided with a prevent-joining means that stores the search preference as the search preference of a prohibited network and, if a network that satisfies the search preference is reported, denies the joining of the reported network.

This prevent-joining means displays a message like "Unable to Report" and prevents joining the channel, even if an instruction to join the channel report is issued. In addition, joining the channel may also be prevented in a manner so that the channel report is not displayed.

In accordance with the present invention in a further aspect, the network search system is additionally provided with an auxiliary means that, if a user is joining the bi-directional communication system for the first time, prompts the setting of the network search preference, and sends the set search preference to the registration means.

For example, a window to input the search preference is displayed. The window changes according to the input, and the user is prompted to set the desired preference in order to search for a network.

In yet another aspect, a protect means is further provided in the network search system in accordance with the invention. The protect means receives for each network the setting of whether to permit reporting of the network, and the notification means notifies the user terminal in accordance with the setting.

When unable-to-report is set by the protect means, the notification means does not notify of the presence of a channel even if the channel satisfies the search preference.

In an even further aspect, the present invention provides a network search component used in a communication system wherein the same network is mutually shared by a plurality of user terminals and simultaneous bi-directional communicate is possible. The network search component is provided with a storage means, a recording means, a preferences-based search means, and a notification means. The storage means stores, associated with a user, one or more search preferences to search for a network. The recording means acquires the state of each network from the communication system, and stores it. The preferences-based search means judges, based on each network state stored in the recording means, whether each network satisfies any search preference. The notification means, based on that judgment, notifies the corresponding user terminal of all networks that meet any search preference of the user.

Taking the example of the chat system, the network search component is provided with a chat server. The network search component uses the above-mentioned method to search for a channel that satisfies each search preference, and notifies the user terminal.

In yet another aspect, the present invention provides a network acquisition device used in an information terminal connected to a server, wherein the same network is mutually shared with other information terminals and simultaneous bi-directional communication is possible. The network acquisition device executes a search for a network and is provided with a configuration means and an output means. The configuration means receives the input of one or more search preferences to search for a network, and transmits it to the server. The output means receives from the server a notification that includes the network name that satisfies at least any search preference, and outputs the notification contents.

In other words, the network search preference is set and sent to the network search component in accordance with the just-described aspect of the present invention. In addition, the network name and supplemental data reported by the network search component in the foregoing aspect of the invention is output to a display screen or the like.

In still another aspect, the invention is embodied in a computer-readable recording medium whereon is recorded a network search program used in a communication system wherein the same network is mutually shared by a plurality of user terminals and simultaneous bi-directional communicate is possible, wherein the network search program is recorded in order to execute steps (a) to (d) below.

(a) a step of storing at least one network search preference linked to at least one user;

(b) a step of monitoring status of the communication system networks for changes according to predetermined parameters and, in response to every occurring status change, storing network status information signaling a changed-status network;

(c) a step of determining based upon the stored network status information whether a changed-status network meets the at least one stored user-linked network search preference; and (d) a step of notifying the at least one user of any changed-status network meeting the stored user-linked network search preference.

Operation herein is similar to that of the invention set forth above as a network search component.

In one still further aspect, the present invention is embodied in a computer-readable recording medium whereon is recorded a network acquisition program used in an information terminal connected to a server, wherein the same network is mutually shared with other information terminals and simultaneous bi-directional communication is possible, that executes a search for a network, wherein the network acquisition program is recorded in order to execute steps (a) and (b) below.

(a) a step of accepting as input at least one network search preference and sending the user-terminal linked network search preference to the server; and (b) a step of receiving from the server a notification including information identifying any network meeting the at least one network search preference, and for output of notification content.

Operation herein is similar to that of the invention set forth above as a network acquisition device.

The foregoing and other objects, features, aspects and advantages of the present invention will become more apparent from the following detailed description in conjunction with the accompanying drawings.

BRIEF DESCRIPTION OF THE DRAWINGS

FIG. 8 is a conceptual diagram illustrating an example of search preference information stored in a search preferences database;

FIG. 9 is a diagram illustrating an example of a keyword requirement list;

FIG. 10 is a diagram illustrating an example of an atmosphere requirement list;

FIG. 11 is a diagram illustrating an example of a status-change requirement list;

FIG. 12 is a diagram illustrating an example of a participating user requirement list;

FIG. 13 is a diagram illustrating an example of a remark list in a channel buffer;

FIG. 14 is a diagram illustrating an example of a status list in a channel buffer;

DETAILED DESCRIPTION OF THE PREFERRED EMBODIMENTS

To explain the present invention more definitely, reference is made to the figures, which illustrate some of its embodiments. Furthermore, the following explains the present invention in the example of a search system that searches a chat system for channels, or chat networks. A "chat network" herein indicates an active communications network wherein a plurality of chat clients are mutually sharing—i.e., chatting in—the same virtual space, such that they can simultaneously communicate bi-directionally. The virtual space distinguishes the chat network, irrespective of its active number of users/user terminals.

Figure 1:
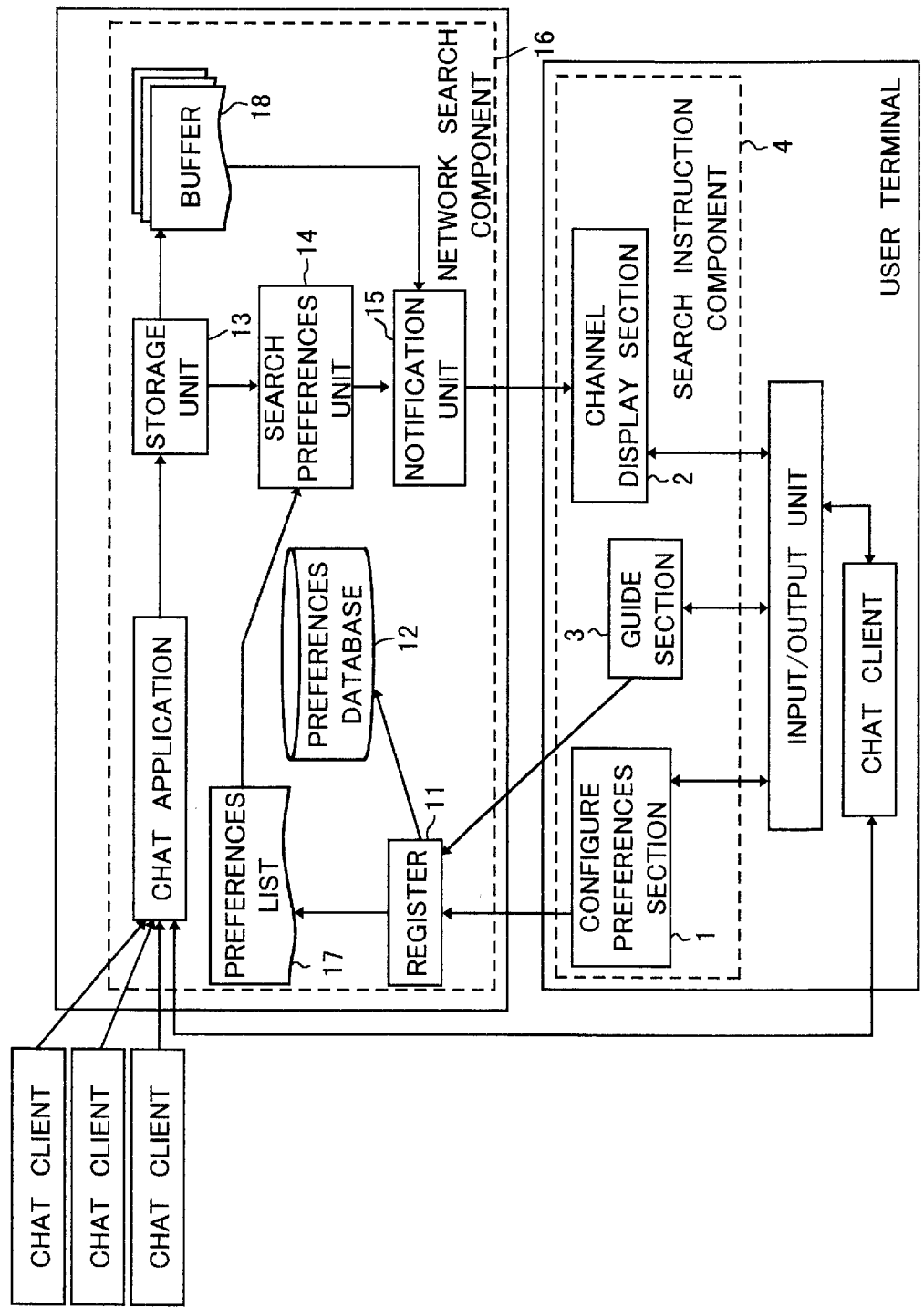
FIG. 1 is a functional block diagram of a network search system in accordance with the present invention.

FIG. 1 is a block diagram depicting a network search system according to a first embodiment of the present invention. The network search system according to the first embodiment comprises a user terminal provided with a chat client and search instruction component 4, and a chat server that can run a chat application and is provided with network search component 16.

User Terminal

Each user terminal connects to a chat server using a chat client, and participates respectively in a desired channel. The search instruction component 4 of each user terminal has a configure preferences section 1, a channel display section 2 and a guide section 3.

Figure 2:
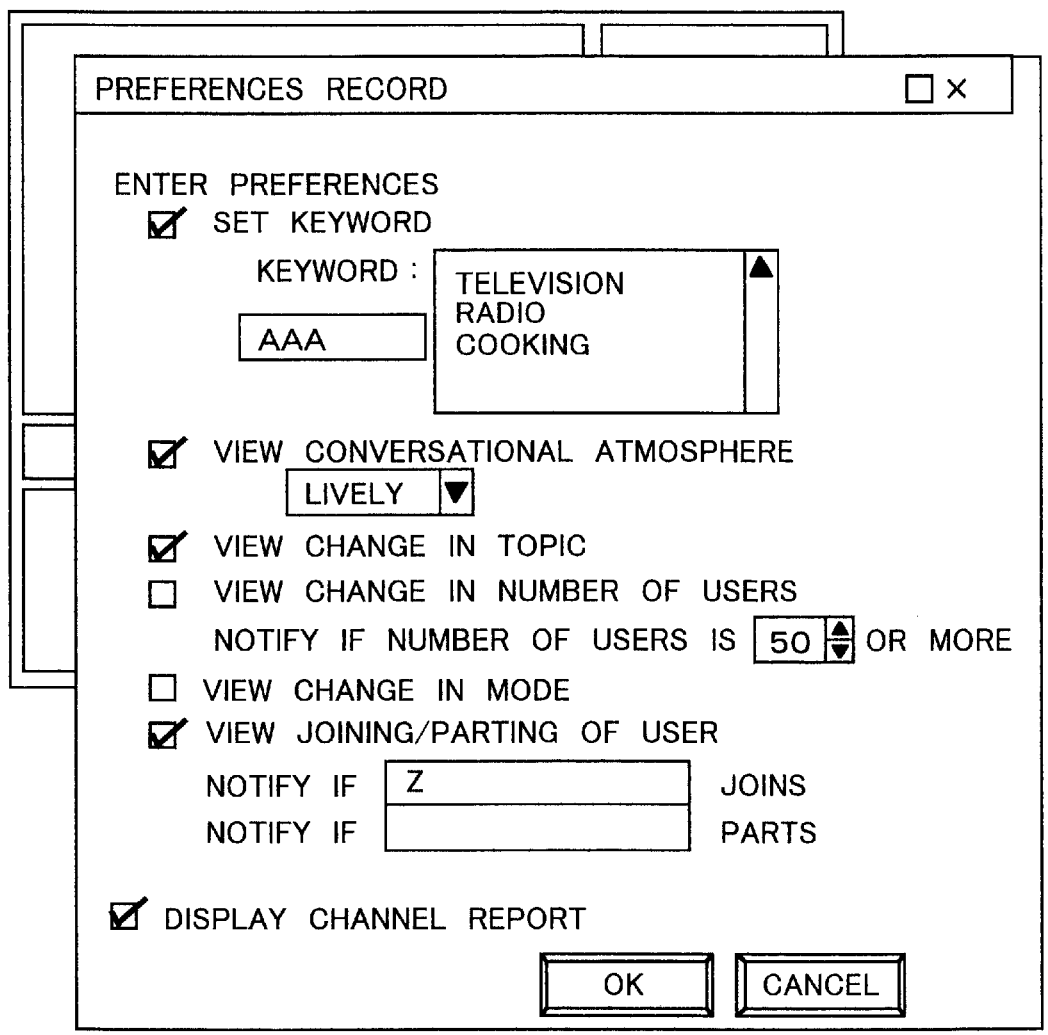
FIG. 2 is a diagram illustrating a window for configuring search preferences.

The configure preferences section 1 displays a configuration window on the screen, receives the setting of the channel search preferences from a user, which it transmits along with the username to the server. As search preferences that can be set, keywords, the frequency of remarks made in a channel, the number of users, channel mode, and participating users can be cited, for example. Herein, channel mode is an identifier that assigns characteristics to a channel, such as "Private," "Secret," or "Invitation-only." Furthermore, not only one, but also a plurality of search preferences can be set. If a plurality of search preferences is set, channel(s) that match any search preference are reported. FIG. 2 shows an example of a configuration window for setting the search preferences. This configuration window will be discussed later.

Figure 3:
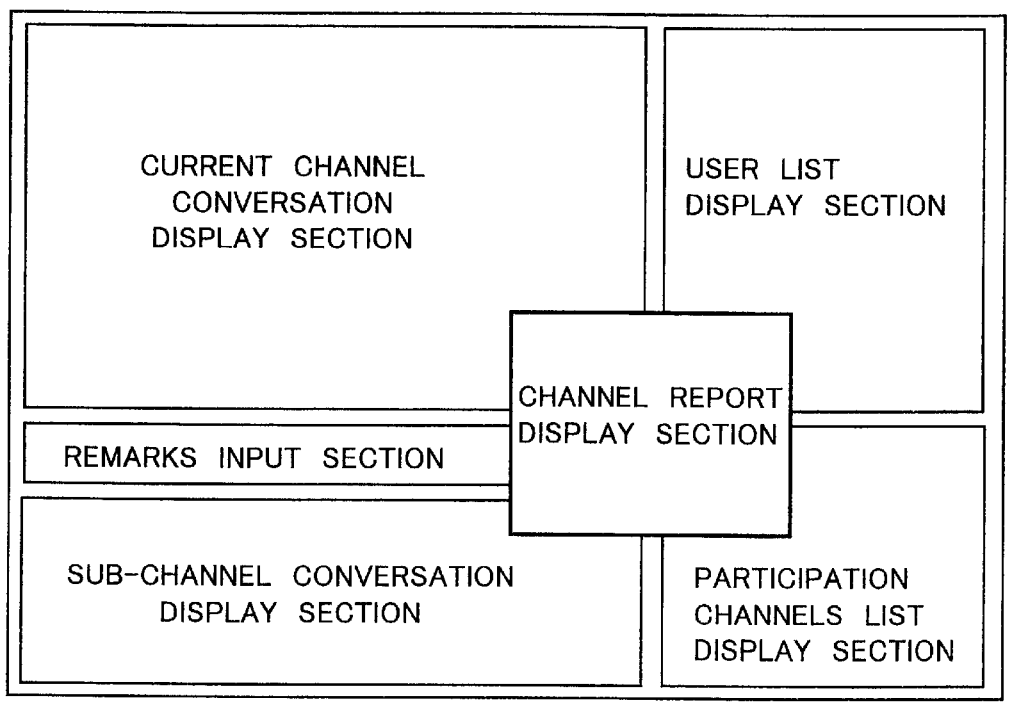
FIGS. 3(a) and (b) are diagrams respectively illustrating an example of a channel list with associated topics, and an example of a user terminal screen wherein the channel list is displayed, in a channel report.

The channel display section 2 displays a list of channels reported by the server that match the aforesaid search preferences (hereinafter, referred to simply as the channel report), as well as the channel report together with predetermined additional report information. This supplemental data includes information that indicates what type of channel the relevant channel is. As supplemental data, topic, which briefly describes conversational content; keywords in accordance with the search preferences that the channel report meets; remark count, channel mode, and user nicknames can be cited, for example. In addition, the channel display section 2 counts the number of notifications by channel, and sorts and displays the reported channels in order of largest count. In other words, the count indicates how many search preferences each reported channel "hit" (i.e., met), the reported channels are displayed in order of extent they match the search preferences. This count may also be included in the supplemental data. FIG. 3(a) shows a display example of a channel report list displayed by the channel display section 2. In addition to the channel report and the number of preferences hit, the channel report list also displays the topic, which briefly describes the topic/subject of the relevant reported channel, as supplemental data. FIG. 3(b) is an example wherein the chat client is capable of displaying a list of channels in which the user is participating. In the figure, the channel display section 2 displays the channel report list separately from the participation channels list.

Figure 4:
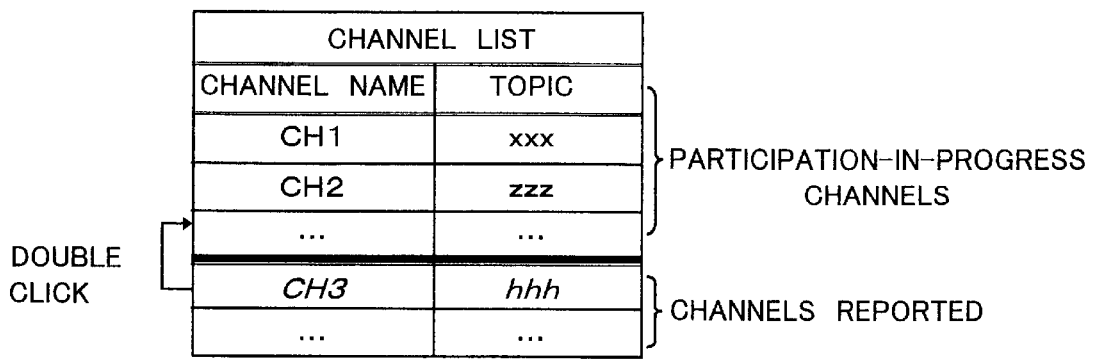
FIGS. 4(a) and (b) are diagrams corresponding to FIGS. 3(a) and (b), but illustrating alternative configurations.
Figure 4:
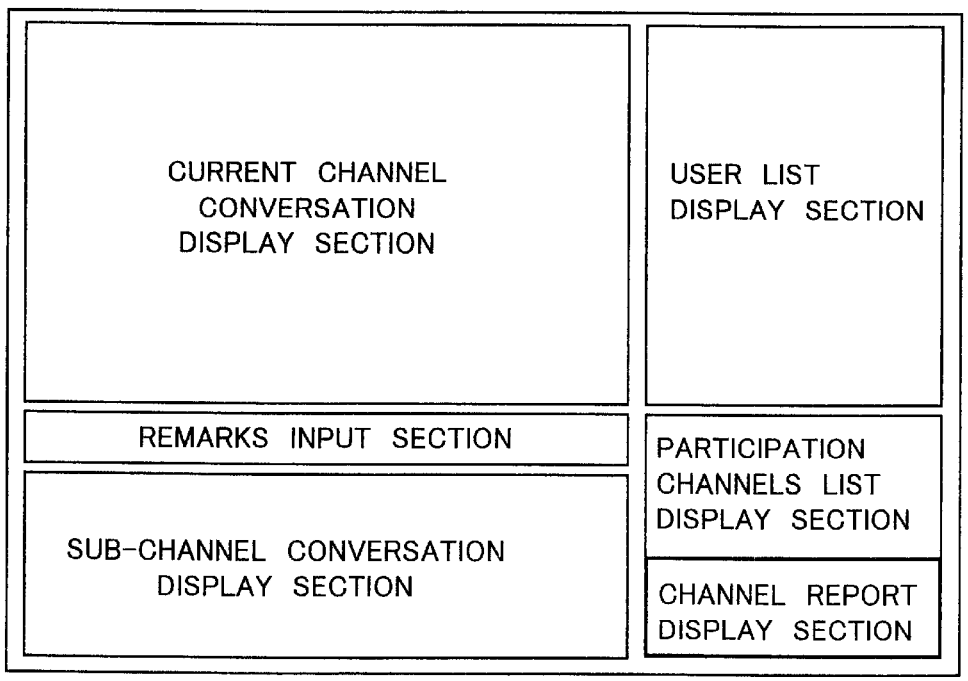

The channel display section 2 is also capable of displaying the channel report list alongside the participation channels list. In this case, the channel report should be displayed in a display different from that of the participation channels so that they can both be visually differentiated. FIGS. 4(a) and (b) show an example wherein the channel report list is additionally displayed with a different font in the list of participation channels. Furthermore, by selecting one from the displayed channel report list and double clicking it with the mouse, it is possible to join that reported channel and to move the relevant channel name onto and display it on the participation channels side. In addition, the network search system herein may also be configured such that by a setting made in advance on the user end, the reported channel is automatically joined. In this case, however, the user may find him or herself joined to too many channels as a consequence of an increasing number of reported channels. Therefore, the network search system preferably is configured so that a limit, such as automatically joining only the top-ranked three among the reported channels, can be or is automatically set.

In addition, in displaying the channel report and supplemental data, channel display section 2 can also change the display in accordance with the contents of the supplemental data and search preferences that the relevant channels match. Varying the display according to the search preferences makes it easy to identify, at a glance, which search preferences a channel matches. An example is to display keyword-matching channels in red, and channels that match network status changes in green. In addition, the network search system may also be configured such that the search preferences are identifiable by varying the display mode according to the search preference contents. In addition to color-coding, various display modes are conceivable, such as a highlight display or a reverse display.

If the user that activated the chat client is joining a chat group for the first time, guide unit 3 provides help for the user to decide which channel is best to join. For example, the network search system may be configured so that when a first-time user connects to a server, the server makes note of the fact that that user is a first-time user. Guide unit 3 displays a guide window in response to that notification, and prompts the user to input preferences like a keyword of interest, a preferred conversational atmosphere (such as lively), or the nickname of a friend.

Figure 5:
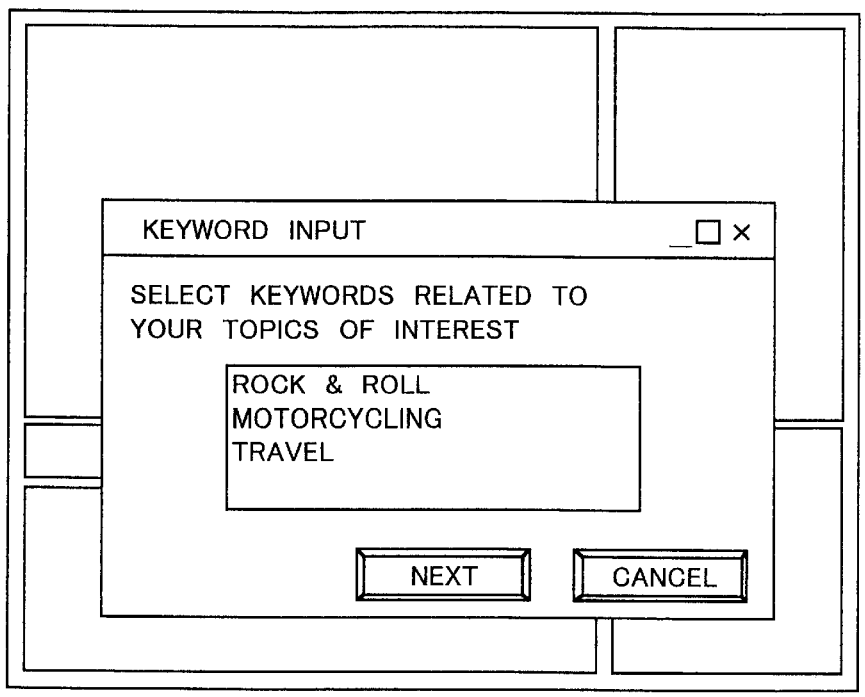
FIG. 5 is a diagram illustrating an example of a guide window (1) in an initial screen for prompting beginners to input a keyword.
Figure 6:
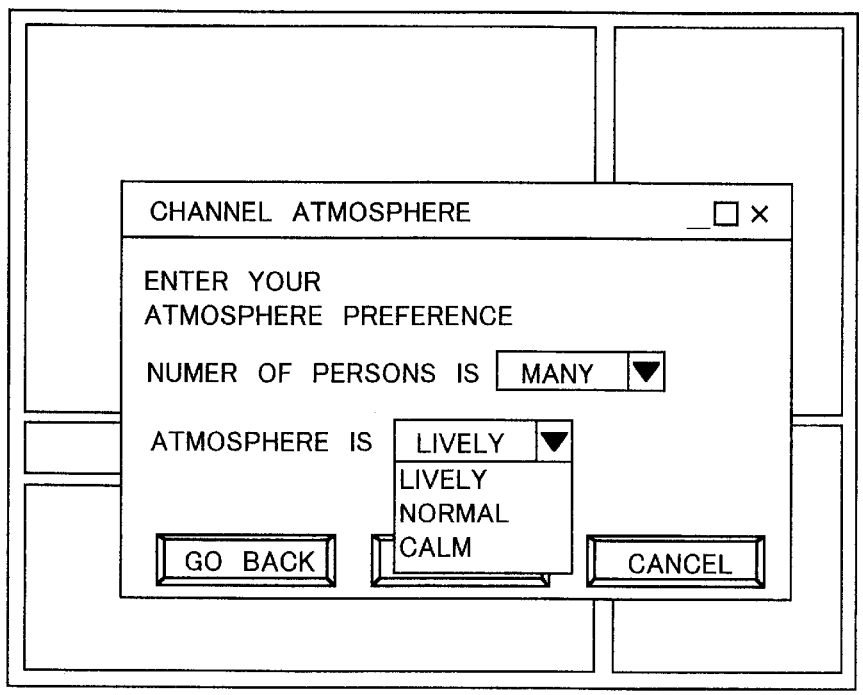
FIG. 6 is a diagram illustrating an example of a guide window (2) in an initial screen for prompting beginners to input channel atmosphere.
Figure 7:
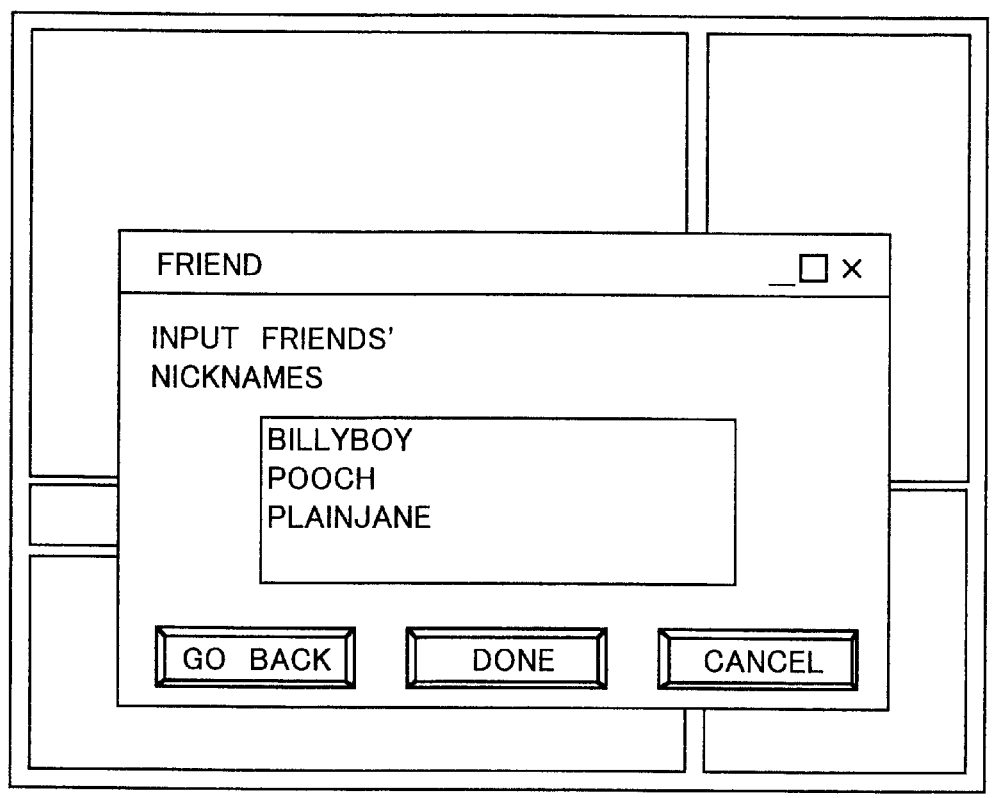
FIG. 7 is a diagram illustrating an example of a guide window (3) in an initial screen for prompting beginners to input a friend's nickname.

FIGS. 5 to 7 show examples of the guide window displayed to the first-time user. FIG. 5 is a guide window wherein a keyword is set. FIG. 6 is a guide window wherein among the channel atmosphere preferences "Lively" has been set. FIG. 7 is a guide window wherein the nickname of another user that the user knows is input. When a preference is entered, guide unit 3 displays the next window in sequence, and prompts the input of successive search preferences. When all the user's preferences have been entered, they are transmitted along with the user name to the server as the channel search preferences.

The notification from the server that the user is a first-time user is made as follows. A database is provided on the server end wherein users' nicknames and user-to-user access records are associated; by consulting the access records, the server determines whether this is the user's first access, and carries out a notification routine. In addition, the chat client running on the user terminal may also be configured such that when a user first attempts to use a chat group, a guide window is displayed as part of prompting the user to set information about the server to which the user terminal is being connected. Providing the guide section 3 thus enables users participating in a chat system for the first time easily to join a personally suitable channel.

Configuration Window

Referring now to the FIG. 2 example of a configuration window for setting channel search preferences, "Set Keyword" is checked, and keyword "AAA" is set. In the present embodiment, when the keyword is set, a search is executed for channels wherein the given keyword appears among exchanged remarks at a predetermined frequency or higher. In illustrating the present embodiment, the remark keyword frequency is assigned to be three or more times per three-minute interval; however, the user may freely set this preference, varying it to suit. A keyword may be selected from among those displayed, or may be directly input from a keyboard into an input box, for example.

In addition, in FIG. 2, "View Conversational Atmosphere" is also checked, and "Lively" is set. If "View Conversation Atmosphere" is set, a search is executed for a channel based on the remark frequency preference. Setting remark frequency levels such as, for example, "Lively," "Normal" or "Calm" in advance as each corresponding to a designated remark frequency facilitates user configuration. In the present embodiment, "Lively" is assigned a three-minute remark count of 10 or more times, "Normal" is assigned 2 to 9 times, and "Calm" is assigned 1 time or fewer.

In addition, if "View Change in Topic" is checked, a search is executed for a channel in which the topic has changed. If the change in the number of users preference is set, a search is executed for a channel in which the number of users is the designated number or greater. In addition, if "View Change in Mode" is checked, changing of the channel mode can be set in the channel search preferences. Furthermore, if "View Joining/Parting of User" is checked, the joining or parting of a specified user can be set in the channel search preferences. In FIG. 2, the joining of user "Z" is set in the channel search preferences.

Server

The server monitors remarks from a plurality of user terminals running the chat application, and distributes the remark contents to other user terminals participating in the same channel. Referring again to FIG. 1, the network search component 16, provided on the server, includes a register 11, a preferences database 12, storage unit 13, a the search preferences unit 14 and a notification unit 15.

The register 11 stores in the preferences database 12 the channel search preferences and user names transmitted from the user terminals. FIG. 8 shows an example wherein the search preferences for five users A, B, C, D and E are registered in the preferences database 12. In FIG. 8, user A has set a keyword, conversational atmosphere, and two other search preferences, and other users have set just a keyword as the search preference.

In addition, the register 11 creates and holds preferences lists 17 wherein duplicates are removed from the search preferences registered by each user. For example, if the preference database 12 stores the information shown in FIG. 8, then preferences lists 17 indicated by the FIG. 9 to FIG. 12 conceptual drawings are created corresponding to preferences database 12. The keyword preference list in FIG. 9 stores the correspondence between keywords and the list of users that have set that keyword as the search preference. The atmosphere preference list in FIG. 10 stores the correspondence between each remark frequency level and the list of users. The status change preference list in FIG. 11 stores the correspondence between the change in status and the list of users that have set that status change as a preference. The participants preference list in FIG. 12 stores the correspondence between designated users and users that have set the joining of those designated users as a search preference.

From the chat server the storage unit 13 receives issued events, analyzes them to generate an issued event report, and records the report content in a buffer 18. Therein, an "event" refers to a remark, mode or topic change request from the user terminal; or to a status change request, such as a joined or parted from channel request. The chat server detects the issuance of an event, and analyzes the issued event. The storage unit 13 acquires the chat server's event analysis results and records the acquired contents in the buffer 18. The event analysis results are, namely, the channel wherein the event issued and whether the contents of the issued event are a remark or a status change request. In addition, the storage unit 13 deletes old content for which a predetermined interval has elapsed.

FIGS. 13 and 14 show examples of content recorded in the buffer 18 by storage unit 13. FIG. 13 is a remark list recorded corresponding to remarks from user terminals. The time when a remark occurs, an identifier that describes the speaker, and the remark contents are respectively matched and recorded in the remark list for each channel. This example shows a case wherein the required records within the past three minutes are held in order to judge the remark frequency of the keyword and the channel atmosphere. FIG. 14 is a status list recorded corresponding to a status change request from a user terminal. The time when a request occurs, an identifier that specifies the requesting user, the requested status change and the status after the change, are respectively matched and recorded in the status list for each channel. This example takes into consideration the frequency with which these status change requests occur, and records for the past 24 hours are held in the status list.

Every time an event issues, the search preferences unit 14 determines, based on the contents of the buffer 18, whether each channel satisfies any preference recorded in the preferences lists 17. If a channel satisfies a preference, the search preferences unit 14 signals to the notification unit 15 that preference, a user list corresponding to the preference, and the channel name.

Based on the preference reported by the search preferences unit 14, the channel that satisfies the preference and the user list, the notification unit 15 notifies the users, listed in the user list, of the channel, as well as predetermined supplemental information. The supplemental information is acquired from the status list in the buffer 18 in accordance with the preferences. Furthermore, although the supplemental information in the present embodiment is acquired by the notification unit 15, the network search system herein may also be configured such that the search preferences unit 14 acquires the supplemental information and reports it along with the preference, channel and user list to the notification unit 15.

Process Flow

I. Main Routine

Next, the following explains the flow of processing in the above-described network search system wherein a search is executed for a channel based on recorded search preferences, and notification is made.

Figure 15:
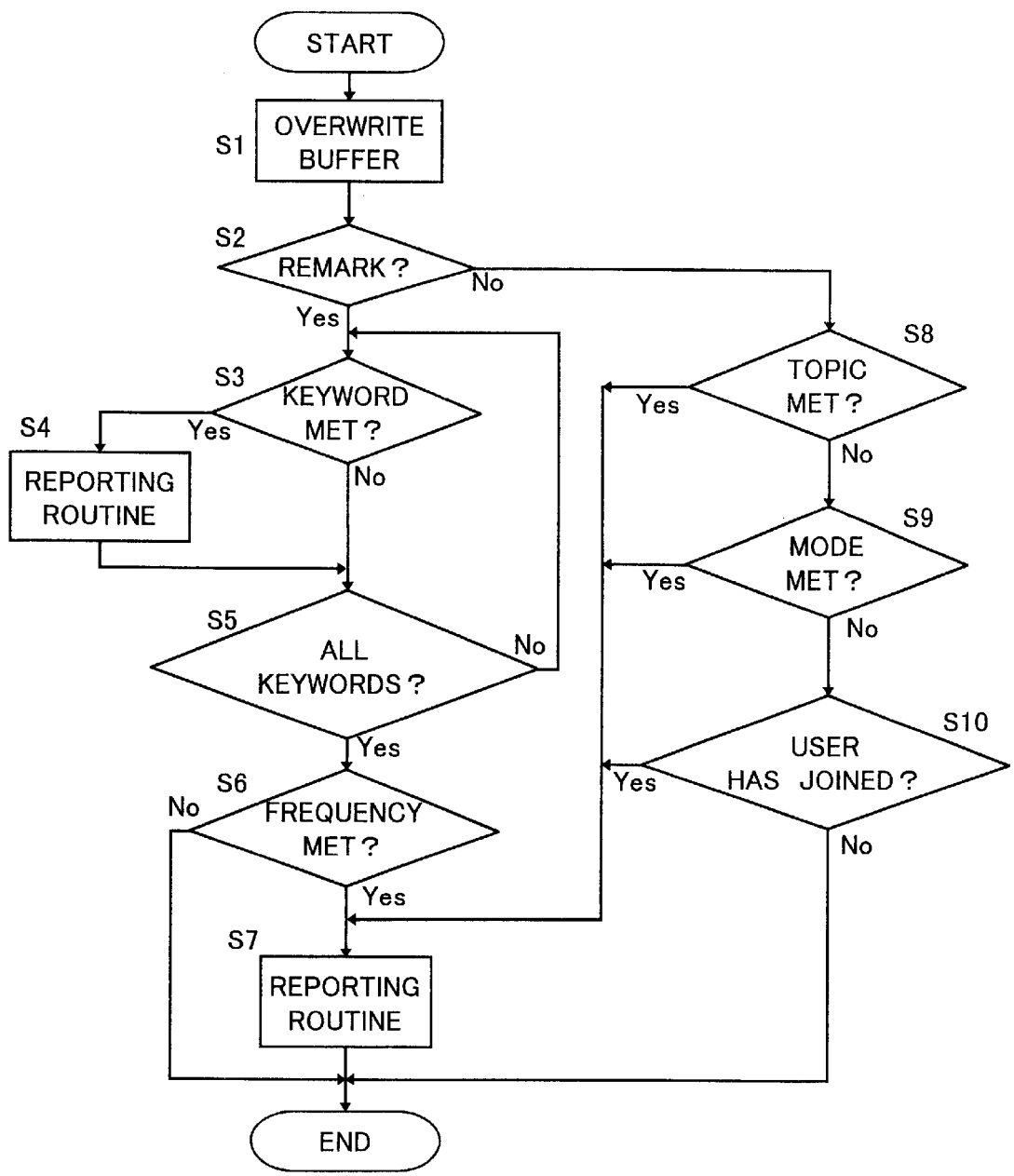
FIG. 15 is a flowchart illustrating process flow in a searching routine executed by the network search component.

FIG. 15 is a flowchart that shows the flow of search processing executed by the network search component 16. For simplicity, an example is taken wherein the search preferences shown in FIG. 8 are recorded in the preferences database 12, the preferences lists 17 list the contents shown in FIG. 9 to FIG. 12, and the buffer 18 stores the remark list and status list shown in FIGS. 13 and 14. The processing below is initiated by the issuance of an event in the chat application.

In step S1, the storage unit 13 acquires from the chat application the channel in which an event issues and its contents, and overwrites the remark list or status list in accordance with the contents. In addition, old records in the buffer 18 for which a predetermined time has elapsed are deleted. For example, records for which three or more minutes have elapsed are deleted from the remark list.

First, in step S2, the search preferences unit 14 determines whether the issued event is a remark or change in status. If the issued event is a remark, the next step is S3. If the event is a status change, the next step is S7, described later.

In step S3, the search preferences unit 14 compares the keyword preference list shown in FIG. 9 and the remark list pertaining to the channel in which the event issues, and determines for each keyword whether the channel now satisfies the keyword preference based on the issued event. For example, the remark list is first searched for keyword "AAA"; if uttered five or more times in three minutes, user list "A, C, D," whose users have set keyword "AAA" as a search preference, is reported along with the channel name and search preference to notification unit 15. The next step is then S4. If the preference is not satisfied for keyword "AAA," the next step is S5, described later.

In step S4, the channel name is reported to the user terminal by a reporting routine, described later, and step S5 ensues.

In step S5, a determination is made as to whether all keywords in the keyword preference list have yet been evaluated; if not, returning again to step S3, the preference is evaluated in the same manner for the next keyword, for example, "BBB." When it is determined that preference evaluation has been completed for all keywords in the keyword preference list, step S6 follows.

In step S6, the search preferences unit 14 compares the atmosphere preference list shown in FIG. 10 and the remark list in the buffer 18, and determines whether the channel now satisfies the remark frequency preference based on the issued event. For example, since remarks within a predetermined time are recorded in the remark list, the remark frequency is calculated from the number of remarks therein; if the result of that calculation conforms to a "7 times/3 min." remark frequency, then the notification unit 15 is notified of the user list "B, C," whose users have selected a remark frequency of "5 times or more/3 min." from the frequency preferences list as the search preference, along with the channel name and search preferences, and step S7 ensues. If remark frequency calculation does not match the preference, the process ends.

By the reporting routine to be described later, likewise as in step S4, step S7 reports the channel name to the user terminal, and the process then ends.

If the search preferences unit 14 determines in step S2 that the issued event is a status change, step S8 follows. In step S8, the search preferences unit 14 determines whether the issued status change request is a topic change request. If it is a topic change request, the state change preference list shown in FIG. 11 from among preferences lists 17 is consulted, the notification unit 15 is notified of user list "A, D," whose users have set a topic change as the search preference along with the channel name and search preference, and step S7 ensues. If there is no change in topic, step S9 follows.

In step S9, the search preferences unit 14 determines whether the issued status change request is a mode change request. If it is a mode change request, the status change preference list shown in FIG. 11 is consulted, the notification unit 15 is notified of the user list whose users have set a mode change as a search preference, along with the channel name and search preference, and step S7 ensues. If the event is not a mode change request, step S10 follows.

In step S10, the search preferences unit 14 determines whether the issued status change request is a user participation request. If it is a user participation request, the user participation list shown in FIG. 12 from among preferences lists 17 is consulted, the notification unit 15 is notified of the user list whose users have set the joining of a user as a search preference, along with the channel name and search preference, and step S7 ensues. If the event is not a user participation request, the process ends.

II. Reporting Routine

Figure 16:
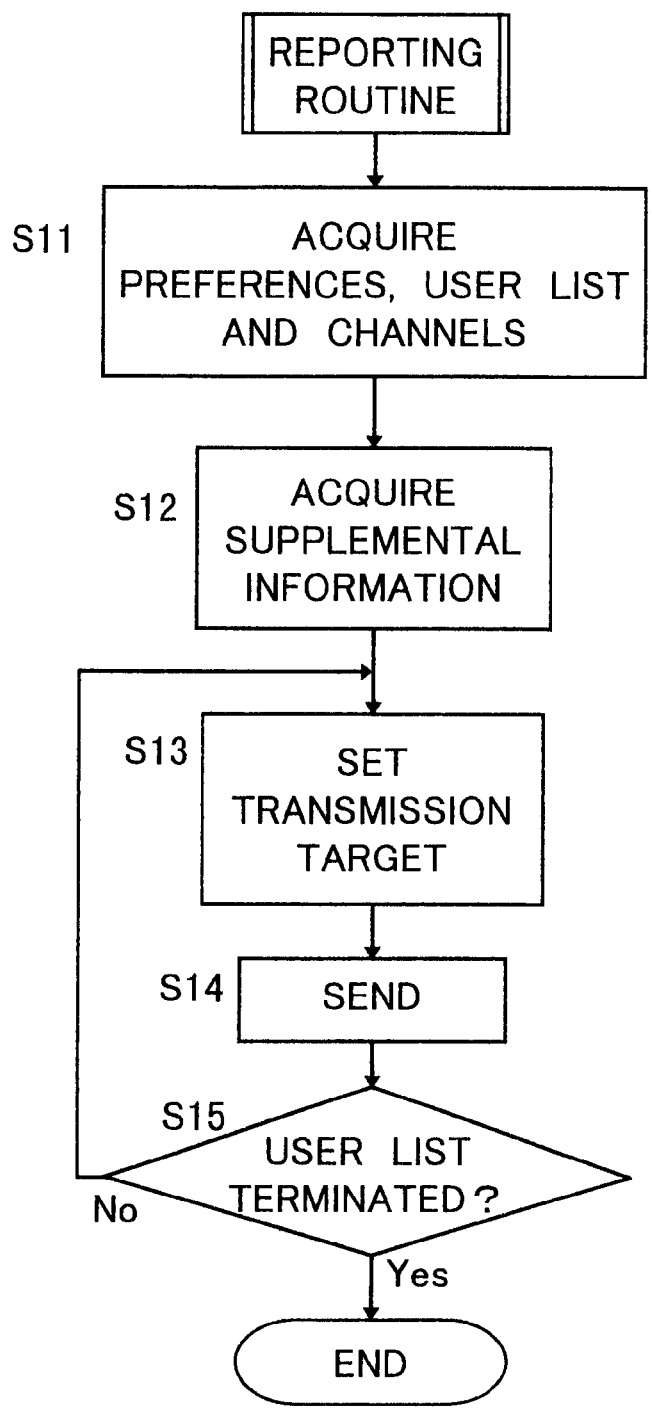
FIG. 16 is a flowchart illustrating process flow in a notification routine executed by a notification unit.

FIG. 16 is a flowchart that diagramming process flow in a reporting routine executed by the notification unit 15. The notification unit 15 initiates the following process by the reception from the search preferences unit 14 in the main routine of notification of the hit preference, user list and channel name.

Initially, in step S11, the notification unit 15 acquires the hit preference, user list and channel name reported by the search preferences unit 14.

In step S12, the notification unit 15 acquires, in accordance with the hit preference, supplemental information from the status list in the buffer 18. For example, if the hit preference is a "topic change," then the topic of the relevant channel is searched for in the status list, and is acquired. If the hit preference is a "mode change," then the mode of the relevant channel is searched for in the status list, and is acquired.

In step S13, the notification unit 15 sets a user in the user list as the transmission target.

In step S14, the notification unit 15 transmits the previously determined channel and supplemental information to the transmission target user terminal, and step S15 ensues.

In step S15, the notification unit 15 determines whether all user terminals listed in the user list have been notified; if all users are not notified yet, the process returns to step S13, in which a new user is set as the transmission target, and transmission is executed. If it is determined that transmission to all users in the user list has completed, the process returns to the main routine illustrated in FIG. 15.

In the above-described first embodiment, it is possible, by a user setting, to set a channel corresponding to some preference to "display-disabled." For example, to prevent a child from exposure to deleterious information, the user stores in advance in the channel display section 2, as a display-disabled preference, keywords thought to be deleterious. Consequently, a box that specifies "Set Channel Report to Display-Disabled" is provided in the configuration window. Channel display section 2 transmits this display-disabled preference to the server end as a regular search preference.

However, if the chat client is notified by the server of a channel and keyword that matches the display-disabled preference, and an instruction to join the relevant channel is output by the chat client, channel display section 2 consults the stored "display-disabled preference." As a result, the channel display section 2 displays that that channel cannot be joined, thus preventing participation in a deleterious channel.

The process to prevent joining in a particular channel can be performed not only on the user terminal end, but also on the server end. For example, the present network search system may be configured such that when channel search preferences are registered in the server by the configure preferences section 1, it is possible to specify whether to report the channel that matches that search preference. If the channel that matches the notification-disabled channel preference and the user that registered that preference are stored along with the channel name in the preferences database, that user terminal is denied participation in the relevant channel. In this case, the server need not notify the user terminal of the channel information.

To register the channel search preferences in the server, configure preferences section 1 need not necessarily be provided in the user terminal; it is also possible to use another application such as a Web browser. In addition, it is also possible to use a technique such as data mining to detect keywords from among ordinary remarks in that chat client, and to automatically register them in a preferences database.

Furthermore, a protect unit (not shown), which accepts the setting of whether to allow reporting of each channel, may be provided in the server, independent of the network search component. This setting is actually performed by the server administrator. If a protect unit is provided, the notification unit 15, before transmitting to the user terminal the channel and supplemental information reported by the search preferences unit 14, consults the notification enable/disable setting set for each channel. Then, the notification unit 15 executes the notification (reporting routine) or cancels the notification in accordance with that setting.

Various details of the present invention may be changed without departing from its spirit nor its scope. Furthermore, the foregoing description of the embodiments according to the present invention are provided for illustration only, and not for the purpose of limiting the invention as defined by the appended claims and their equivalents.

What is claimed is:

1. For utilization by a communication system comprising user terminals connected to a network, wherein a plurality of the user terminals share at least one of a plurality of virtual spaces, establishing at least one chat network active for simultaneous bi-directional communication, a chat network search method comprising steps of:

storing at least one chat network search preference linked to at least one user terminal;

monitoring a status of the at least one chat network for changes according to predetermined parameters related to the at least one chat network search preference and, in response to every occurring status change, storing chat network status information signaling a changed-status chat network;

determining, based upon the stored chat network status information, whether a changed-status chat network meets the at least one chat network search preference linked to the at least one user terminal; and notifying the at least one user of any changed status chat network meeting the chat network search preference linked to the at least one user terminal.

2. A network search system for use in a bi-directional communication system comprising user terminals connected to a network, wherein a plurality of the user terminals share at least one of a plurality of virtual spaces, establishing at least one plurality of chat network active for simultaneous bi-directional communication by exchanging remarks, the network search system comprising:

a storage means for storing at least one chat network search preference;

a registration means for registering in said storage means the at least one chat network search preference;

a configuration means for receiving as input the at least one chat network search preference, linking the at least one chat network search preference to at least one user terminal and sending the chat network search preference linked to the at least one user terminal to said registration means;

a monitoring and recording means for monitoring status of the communication system for changes according to predetermined parameters related to the at least one chat network search preference and, in response to occurring status changes, storing chat network status information signaling a changed-status chat network;

a preferences-based search means for determining, based upon the chat network status information stored in said monitoring and recording means, whether a changed-status chat network meets the at least one chat network search preference linked to the at least one user terminal;

a notification means for generating chat network notification information identifying any changed-status chat network meeting the at least one chat network search preference linked to the at least one user terminal and sending the chat network notification information to the user terminal linked to the at least one chat network search preference; and an output means for output at the user terminal linked to the at least one chat network search preference of the chat network notification information generated by said notification means.

3. The chat network search system in accordance with claim 2, further comprising a prevent-joining means for storing a prohibited chat network identifier as the at least one user-terminal linked chat network search preference, and for denying user participation in a changed-status chat network meeting the at least one chat network search preference linked to the at least one user terminal.

4. The network search system in accordance with claim 2, further provided with an auxiliary means for prompting first-time users of the bi-directional communication system to set chat network search preferences, and for sending any set chat network search preferences to said registration means.

5. The network search system in accordance with claim 2, further comprising a protect means for receiving from a user terminal a setting determining for each of the chat networks whether to permit sending by said notification means of chat network identification information; wherein said notification means sends the chat network notification information to the user terminal in accordance with the setting.

6. A chat network search component for use in a communication system comprising user terminals connected to a network, wherein a plurality of the user terminals share at least one of a plurality of virtual spaces representing chat networks, establishing at least one chat network active for simultaneous bi-directional communication, the chat network search component comprising:

a storage means for storing at least one chat network search preference linked to at least one user terminal;

a monitoring and recording means for monitoring status of the communication system chat networks for changes according to predetermined parameters related to the at least one chat network search preference and, in response to occurring status changes, storing chat network status information signaling a changed-status chat network;

a preferences-based search means for determining based upon status information of each of the chat networks stored in said monitoring and recording means whether a changed-status chat network meets the at least one chat network search preference linked to the at least one user terminal; and a notification means for generating chat network notification information identifying each of changed-status chat networks meeting the at least one chat network search preference linked to the at least one user terminal and sending the chat network notification information to the at least one user terminal linked to the at least one chat network search preference.

7. The chat network search component in accordance with claim 6, wherein said notification means acquires from said monitoring and recording means predetermined supplemental information related to any changed status chat network meeting the at least one chat network search preference linked to the at least one user terminal, and sends the predetermined supplemental information along with the chat network notification information to the user terminal linked to the at least one chat network search preference.

8. The chat network search component in accordance with claim 7, wherein said preferences-based search means further acquires supplemental information related to any changed-status chat network meeting the at least one chat network search preference linked to the at least one user terminal; and wherein said notification means sends the supplemental information along with the chat network notification information to the user terminal linked to the at least one chat network search preference.

9. The chat network search component in accordance with claim 6, wherein said storage means stores as the at least one chat network search preference at least a keyword;

said monitoring and recording means monitors remarks exchanged via the chat networks of the communication system, makes temporal records of each occurrence in monitored remarks of the stored keyword, and retains the temporal records dating back predetermined unit hours/minutes; and said preferences-based search means determines, according to occurrences of the keyword in the monitored remarks per unit time, whether any of the chat networks meets the keyword search preference.

10. The chat network search component in accordance with claim 6, wherein:

said storage means stores at least remark frequency as the at least one chat network search preference;

said monitoring and recording means monitors remarks exchanged via the chat networks, for each chat network makes temporal records of monitored remarks, and retains the temporal records dating back predetermined unit hours/minutes; and said preferences-based search means determines, according to remark occurrences per unit time for each chat network, whether any of the chat networks meets the chat network search preference for remark frequency.

11. The chat network search component in accordance with claim 6, wherein:

said storage means stores as the at least one search preference at least a change in topic of remarks being exchanged via the chat networks of the communication system;

said monitoring and recording means, according to the predetermined parameters identifying topics, monitors remarks exchanged via the chat networks of the communication system for occurrences of change in topic in each chat network, and stores each occurrence of a change in topic; and said preferences-based search means determines according to the occurrences of change in topic in each chat network whether any of the chat networks meets the topic change preference.

12. The chat network search component in accordance with claim 6, wherein:

said storage means stores at least a chat network search preference;

said monitoring and recording means monitors the chat networks of the communication system for occurrences of change in number of users on a chat network, and stores each occurrence of a change in chat network user number; and said preferences-based search means determines, in response to the occurrence of change in chat network user number, whether a chat network user number is a number greater than or equal to a predetermined number set by the at least one chat network search preference for a chat network user number.

13. The chat network search component in accordance with claim 6, wherein:

said storage means stores at least the joining or parting of a user on a chat network as the at least one search preference;

said monitoring and recording means monitors the chat networks of the communication system for occurrences of change in user on a chat network, and stores each occurrence of a change in user; and said preferences-based search means compares a number of the users on a chat network before and after the occurrence of a change in users and determines whether the number is greater than or equal to a predetermined number set by the at least one search preference for a number of users.

14. The chat network search component in accordance with claim 6, wherein:

said storage means stores at least one chat network mode as the at least one chat network mode preference;

said monitoring and recording means, according to the predetermined parameters defining modes, monitors the chat networks of the communication system for occurrences of change in chat network mode, and stores each occurrence of a change in mode; and said preferences-based search means determines, according to the occurrence of a change in mode in a chat network, whether the chat network meets the at least one chat network mode preference.

15. For use by an information terminal connected to a server executing chat network searches and enabling the information terminal to communicate bi-directionally with other information terminals simultaneously by mutually sharing a chat network, a chat network acquisition device comprising:

a configuration means for accepting an input of at least one chat network search preference, said configuration means also for sending the chat network search preference to the server;

an output means that receives from the server a notification including information identifying any changed-status chat network meeting predetermined parameters related to the at least one chat network search preference, and for output of notification content.

16. The chat network acquisition device in accordance with claim 15, wherein said output means displays the chat network notification information differentially according to content.

17. The chat network acquisition device in accordance with claim 15, wherein said output means, based on chat network notification information, counts times any changed-status chat network meets at least one chat network search preference, and displays the chat network notification information differentially according to a count.

18. A computer-readable recording medium whereon a chat network search program is recorded for use by a communication system comprising user terminals connected to a network, wherein a plurality of the user terminals shares at least one of a plurality of virtual spaces, establishing at least one chat network active for simultaneous bi-directional communication, wherein the chat network search program is recorded to execute:

storing at least one chat network search preference linked to at least one user;

monitoring status of the communication system chat networks for changes according to predetermined parameters related to the at least one chat network search preference and, in response to every occurring status change, storing chat network status information signaling a changed-status chat network;

determining based upon the stored chat network status information whether a changed-status chat network meets the at least one stored user-linked chat network search preference; and notifying the at least one user of any changed-status chat network meeting the at least one chat network search preference.

19. A computer-readable recording medium whereon a chat network acquisition program is recorded for use by an information terminal connected to a server executing chat network searches and enabling the information terminal to communicate bi-directionally with other information terminals simultaneously by mutually sharing a chat network, wherein the chat network acquisition program is recorded to execute:

accepting an input of at least one chat network search preference and sending the chat network search preference to the server; and receiving from the server a notification including information identifying any changed-status chat network meeting predetermined parameters related to the at least one chat network search preference, and for output of notification content.

* * * * *